Sept. 26, 1933.  A. E. CHURCH  1,928,219
COMPRESSION TYPE VALVE TOOL
Filed May 27, 1932   3 Sheets-Sheet 1

INVENTOR
A. E. CHURCH

BY E. B. Birkenbuel.
ATTORNEY

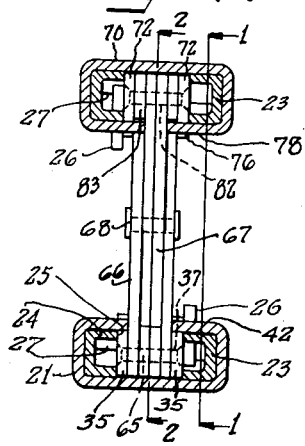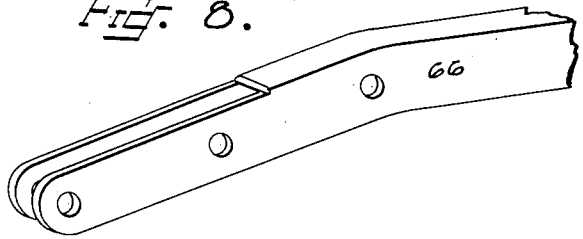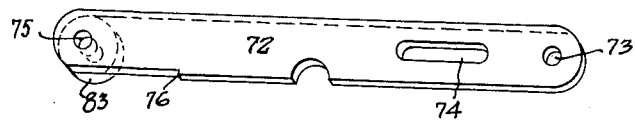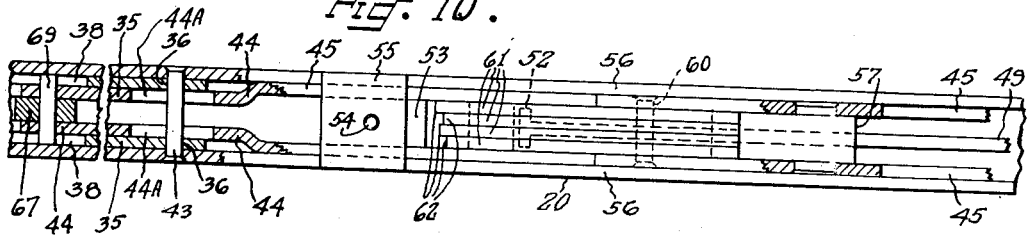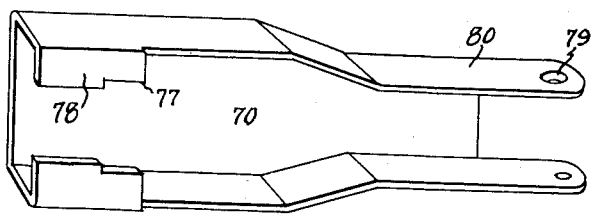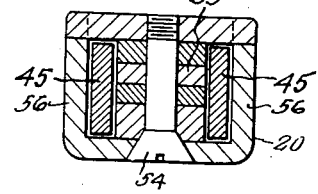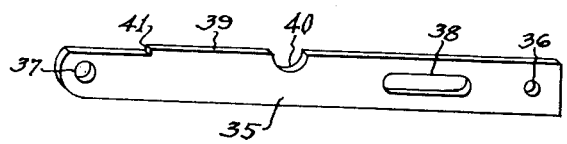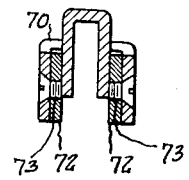

Sept. 26, 1933.     A. E. CHURCH     1,928,219
COMPRESSION TYPE VALVE TOOL
Filed May 27, 1932     3 Sheets-Sheet 3

INVENTOR
A. E. CHURCH
BY E. B. Birkenbeuel
ATTORNEY

Patented Sept. 26, 1933

1,928,219

UNITED STATES PATENT OFFICE 1,928,219

COMPRESSION TYPE VALVE TOOL

Arthur E. Church, Portland, Oreg.

Application May 27, 1932. Serial No. 613,880

6 Claims. (Cl. 29—86.3)

This invention relates generally to tools for repairing internal combustion engines, and particularly to that type of device in which the spring is compressed by applying the tool to opposite ends thereof.

The main object of this invention is the production of a highly efficient and universal form of valve spring compression tool.

The second object is to produce a valve spring compression tool whose jaws move in approximate parallelism at all times.

The third object is to provide the jaws with a slight divergence to off-set lost motion due to clearances in the parts and thereby prevent the accidental slipping of the jaws with relation to the work.

The fourth object is to provide a valve lifting tool having great leverage and at the same time capable of operating in various portions of a wide range of positions.

The fifth object is to produce a valve lifter of the type referred to in which the jaws are interchangeable and off-set in varying degrees for the purpose of making it possible to adapt the tool to a wide range of working requirements.

The sixth object is to provide a tool capable of use in connection with the removing of the tappet assembly.

The seventh object is to provide a valve lifter capable of reaching parts ordinarily inaccessible.

The eighth object is to provide a valve lifter having a wide range of interchangeable jaws adapting the device to use in connection with any of the present-day styles of internal combustion engines, as well as other designs not yet on the market.

The ninth object is to produce a tool which will be found useful in elongating or compressing helical springs in cylindrical or in tapering form.

The tenth object is to provide a unique form of ratchet mechanism adapted to hold the setting of the tool in any one of a large number of closely spaced positions, thereby giving the operator unlimited choice in the setting of the tool and also providing the maximum amount of leverage or mechanical advantage at the moment of greatest load on the tool.

These, and other objects, will become more apparent from the specification following as illustrated in the accompanying drawings, in which:

Fig. 7 is a section taken along the line 7—7 in Fig. 1.

Fig. 8 is a perspective view of the lower end of the hand lever.

Fig. 9 is a perspective view of one of the parallel link members.

Fig. 10 is a section taken along the line 10—10 in Fig. 2.

Fig. 11 is a section taken along the line 11—11 in Fig. 1.

Fig. 12 is a perspective view of the upper jaw holder.

Fig. 13 is a section taken along the line 13—13 in Fig. 2.

Fig. 14 is a perspective view of one of the lower horizontal link members.

Similar numbers of reference refer to similar parts throughout the several views.

Figure 1:
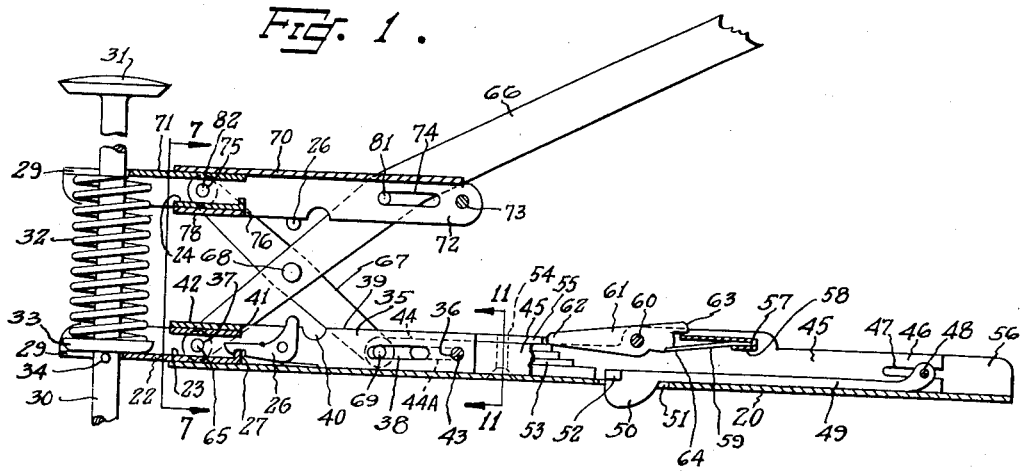
Fig. 1 is a longitudinal section through the device preparatory to the compression of the spring, taken along the line 1—1 in Fig. 7.
Figure 2:
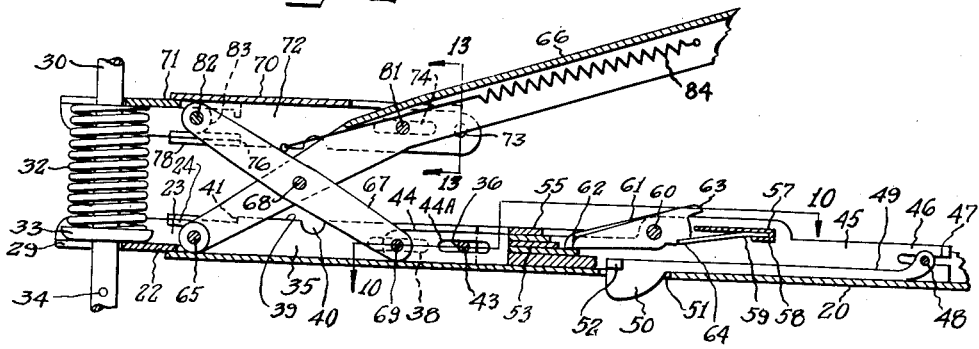
Fig. 2 is a longitudinal section along the line 2—2 in Fig. 7.
Figure 4:
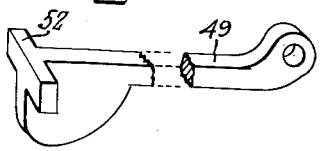
Fig. 4 is a perspective view of the latch.

The device is, of course, usable in any position but for the sake of convenience the terms "upper" and "lower" will be employed in its description.

Referring in detail to the drawings, there is shown a lower handle member 20 which is channel-shaped in cross section and which is provided with an enlarged end 21 which serves as a holder for a lower jaw 22, whose shank 23 is adapted to slip into the holder 21 which shank is provided with the inturned lugs 24 whose inner edges 25 are spaced from each other.

Mounted within the jaw holder 21 is a spring-urged latch 26 which is adapted to engage the inturned lug 27 of the jaw 22 when it is pushed into the holder 21 and serves to retain the jaw in position. The jaw 22 is provided with a slot 28 on its shank 23, which slot is for clearance purposes. The work-engaging end of the jaw 22 is also provided with a slot 29 adapted to receive the stem 30 of the valve 31 whose spring 32, washer 33 and key 34 are indicated.

On the inner side of the holder 21 is mounted a pair of spaced links 35 (as shown in Fig. 14).

Each link 35 has a hole 36 near one end and a hole 37 near the opposite end, and also a slot 38 between the holes 36 and 37. The edge 39 is provided with a notch 40 and a shouldered portion 41. The shouldered portion 41 engages the inturned lugs 42 of the lower jaw holder 21. A pin 43 passes through the holes 36 of the links 35 and secures them in position with relation to the handle 20.

Between the links 35 are the slotted off-set portions 44 of the slides 45 whose ends 46 are each provided with a slot 47 for the reception of a transverse pin 48 which passes through the handle 20. On the pin 48 is hingedly mounted a release bar 49 having a projection 50 extending through the opening 51 in the handle 20. The end of the bar 49 nearest the projection 50 is provided with transversely projecting lugs 52. The pin 43 passes through the slots 44A in the ends 44.

Figure 5:
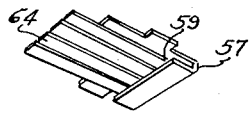
Fig. 5 is a perspective view of the spring and holder.
Figure 16:
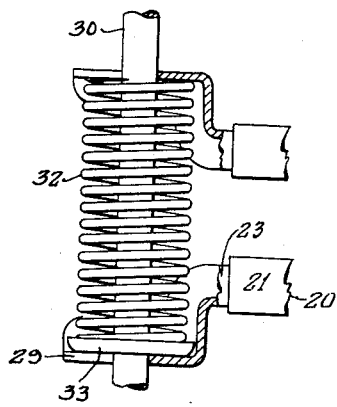
Fig. 16 shows a pair of off-set jaws in a separated position.
Figure 17:
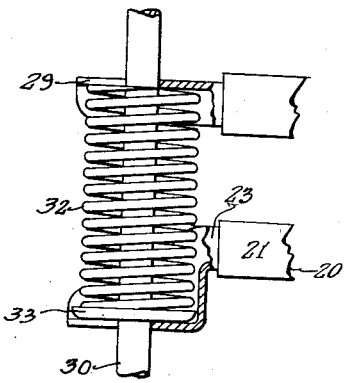
Fig. 17 shows one straight jaw and one off-set jaw being used together.
Figure 18:
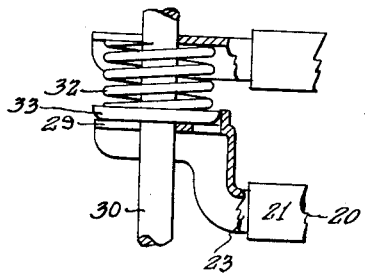
Fig. 18 shows the upper jaw straight and the lower jaw off-set upwardly.
Figure 15:
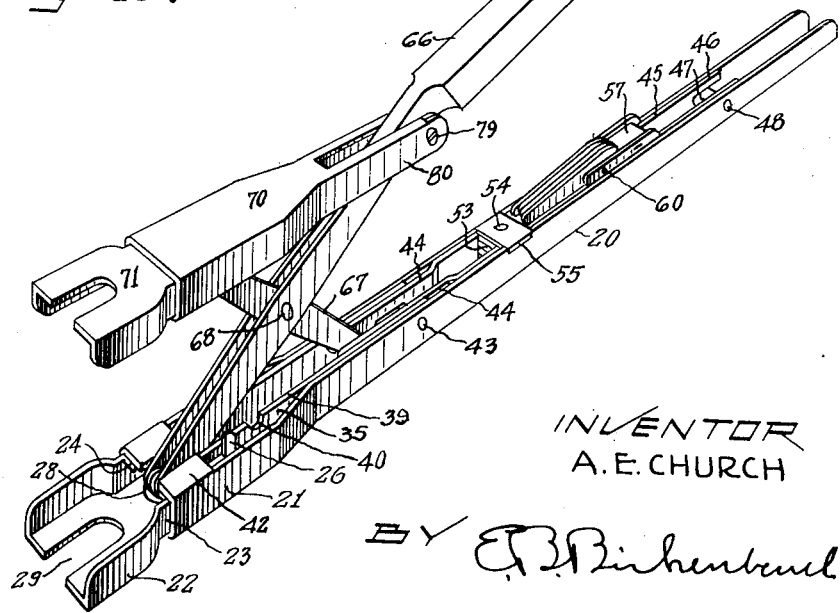
Fig. 15 is a perspective view of the entire tool.

Secured in the bottom of the channel-shaped handle 20 is a series of stepped plates 53 which are held in place by a screw 54 which passes through all of the plates 53 and into a cap plate 55 which is recessed into the sides 56 of the handle 20. The slides 45 pass freely under the cap 55 and between the sides 56 and the stepped plates 53. Between the slides 45 is secured a flat spring holder 57 whose end 58 is turned backwardly against a multiple arm spring 59 (as shown in Fig. 5).

Across the slides 45 is mounted a transverse pin 60 which carries a plurality of pawls 61 whose points 62 vary in length measured from the center of the pin 60 for the purpose of providing a fine take-up or latch for the sliding members 45. The rearmost end of each pawl 61 is provided with a stop lug 63 which engages the top side of the spring holder 57, while the individual spring arms 64 engage their respective pawls 61.

Hingedly attached to a pin 65 which passes through the holes 37 in the link 35 is a hand lever 66. Intersecting the hand lever 66 is a lever 67 which is intersected by and pivotally attached to the lever 66 by a rivet 68. The lower end of the lever 67 is joined by a pin 69 to the off-set portions 44 of the slide member 45. The pin 69 extends into the slots 38 for guiding purposes.

Opposite the holder 21 and parallel thereto is a holder 70 adapted to slidably receive a jaw 71 which may be off-set or straight, as shown, and which is latched in position in precisely the same manner and by the same kind of parts 26 and 27 as are the lower jaws 22.

Inside of the upper holder 70 is placed a pair of links 72 (as shown in Fig. 9). The links 72 are provided with a hole 73 and slot 74 at one end and a hole 75 and off-set 76 at the other end. The offset 76 engages the off-set 77 in the inturned portion 78 of the upper jaw holder 70, and the hole 73 registers with the holes 79 in the narrow portion 80 of the jaw holder 70.

Passing through the lever 66 is a transverse pin 81 which extends into the slots 74 of the links 72. The upper end of the lever 67 is attached to the links 72 by means of a pin 82 which passes through the hole 75. It is desirable to place a washer 83 on the inner side of each link 72 around the pin 82.

From the foregoing it can be seen that a pressure on the hand lever 66 will cause the jaw holder 70 to move toward the holder 21, and of course carries the jaws 22 and 71 toward each other. While this is taking place the pawl points 62 are successively dropping over the edges of the stepped plates 53 by reason of the fact that the slides 45, which carry the pawls 61, are moving away from the spring-engaging end of the tool.

Figure 3:
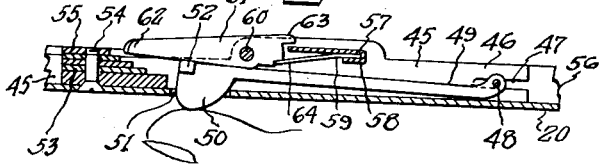
Fig. 3 is a fragmentary longitudinal section through the latch mechanism.
Figure 6:
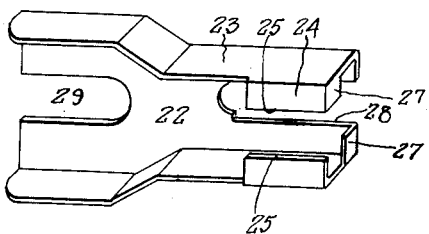
Fig. 6 is a perspective view of a jaw.

When it is desired to release the spring it is only necessary to apply pressure to the projection 50 which will lift all of the pawls (as shown in Fig. 3) permitting the jaws 22 and 71 to separate, under the action of the spring 32.

Although this device has been designed primarily for use in connection with that type of valve mechanism in which the valve spring is placed between the jaws of the device, it is obvious that it has many other uses. Also by employing straight or off-set jaws, or by reversing the relationship to each other or to the tool itself, or both, the tool may be adapted to a great variety of working conditions, always remembering that although the relative movement of the jaws for a given operation is less than is commonly obtained in other devices of this character, due to the increased leverage and provided the movement is still ample, since, due to the combining of the off-set and straight jaws, the range of operations may be varied at will. For example, although the full movement of the jaws at a single operation of the hand levers 20 and 66 is only about one and one-half inches one set of jaws will work very close up to one and one-half inches and another set of jaws from two and one-half inches up to four inches, and by combining the jaws, as suggested, any intermediate range may be easily attained.

Attention is called to my copending application Serial Number 613,879. Attention is also called to the fact that while the jaw holders 21 and 70 are in seeming parallelism they actually converge sufficiently to off-set any lost motion due to clearances between the jaws and their respective holders.

In some cases it will be found desirable to employ a spring 84 between the members 66 and 67 to urge the same apart.

I claim:

1. A valve tool comprising a pair of jaw holders adapted to move in parallelism with each other, slidable jaws removably mounted within the outer end of said holders, levers for moving said jaw holders in parallelism with each other, a slide mounted on one of said jaw holders, a plurality of stepped plates fixedly mounted on the jaw holders, and a plurality of pawls mounted on said slide together with means for rendering said pawls inoperative.

2. A valve tool having a pair of parallel jaw holders, a pair of intersecting levers pivoted at intermediate points between said jaw holders one end of each of said levers being hinged to one of said jaw holders, one of said levers being slidably connected to one of said jaw holders, and having an operating handle forming an extension for said lever, the remaining end of the other lever having attached thereto a slide, a handle for the second jaw holder forming a guide for said slide, and a ratchet mechanism between said slide and handle whereby a closing action of said jaw holders will be successively maintained by said ratchet mechanism.

3. A valve tool consisting of an elongated handled jaw holder, the combination of a second jaw holder disposed in parallelism with said first mentioned jaw holder, an operating handle having its forward end hingedly connected to the forward end of said elongated jaw holder, and having an intermediate point of said operating lever slidably attached to the second jaw holder, an intersecting lever pivoted to said operating lever and to the forward end of said second jaw holder, a slide attached to the rearmost end of said second lever, a plurality of pawls mounted on said slide, a stepped surface for engaging said pawls successively, and means for manually releasing said pawls.

4. A compression type of valve tool comprising a straight elongated handle member having a jaw holding socket at one end thereof, a second socketed jaw holder parallel to said straight handle, a bent handle hinged to the socket end of said straight handle and slidably connected to the opposite end of said second jaw holder, a lever hingedly intersecting said handle and having one end hinged to the socket end of said second jaw holder, a slide mounted in said straight handle hinged to the adjacent end of said lever, stepped plates secured within said slide to said straight handle, a plurality of off-set pawls carried by said slide adapted to alternately engage the successive steps in a manner to hold said slide against longitudinal movement in one direction, and jaws removably mounted with said holders.

5. A compression type of valve tool comprising a pair of parallel socketed jaw holders one of which has a straight extension handle formed integral therewith, a slide mounted within said handle having ratchet means for determining the longitudinal position of said slide in said handle, a diagonal lever hinged between said slide and the opposite end of the opposite jaw holder, a bent handle hinged to the socket end of said handled jaw and to an intermediate point on said lever, and having a third connection comprising a pin occupying a slot in said jaw holder, and reversible and invertible jaws in said sockets having off-sets formed therein for varying the operating range of said jaws.

6. A compression type of valve tool comprising a channel shaped straight handle having a jaw holding socket at one end and having a slide occupying said channel including a ratchet for varying the longitudinal relationship of said slide and handle, a second jaw holder parallel at all times to said first mentioned holder, a diagonal lever hinged at its outer end to the second holder and at its inner end to said slide, a forked handle pivotally intersecting said lever and having one end hinged to the socket end of said handled jaw holder, said bent handle having a pin passing therethrough, a second jaw holder having a slide formed therein adapted to slidably engage said pin, and a spring for urging said handles apart.

ARTHUR E. CHURCH.